United States Patent
Wang et al.

(10) Patent No.: US 8,743,831 B2
(45) Date of Patent: Jun. 3, 2014

(54) METHOD FOR ACQUIRING PACKET DATA CONVERGENCE PROTOCOL STATUS REPORT AND PACKET DATA CONVERGENCE PROTOCOL ENTITY

(75) Inventors: Guanzhou Wang, Shenzhen (CN); Jian Zhang, Shenzhen (CN); Jian Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 83 days.

(21) Appl. No.: 13/508,775

(22) PCT Filed: Nov. 9, 2010

(86) PCT No.: PCT/CN2010/078573
§ 371 (c)(1),
(2), (4) Date: May 9, 2012

(87) PCT Pub. No.: WO2011/057559
PCT Pub. Date: May 19, 2011

(65) Prior Publication Data
US 2012/0224525 A1    Sep. 6, 2012

(30) Foreign Application Priority Data
Nov. 10, 2009   (CN) .......................... 2009 1 0222117

(51) Int. Cl.
*H04Q 7/00*     (2006.01)
*H04W 80/04*    (2009.01)
*H04W 84/12*    (2009.01)
*H04W 36/18*    (2009.01)

(52) U.S. Cl.
CPC .............. *H04W 80/04* (2013.01); *H04W 84/12* (2013.01); *H04W 36/18* (2013.01)
USPC ............ 370/331; 370/328; 370/329; 370/310

(58) Field of Classification Search
CPC ...... H04W 80/04; H04W 36/18; H04W 84/12
USPC .......................... 370/331, 328–329, 310, 242
See application file for complete search history.

(56) References Cited

U.S. PATENT DOCUMENTS 7,936,723 B2 *   5/2011   Yi et al. ........................ 370/331
7,978,616 B2 *   7/2011   Chun et al. .................... 370/242
(Continued)

FOREIGN PATENT DOCUMENTS

CN       101116277 A    1/2008
CN       101132261 A    2/2008
(Continued)

OTHER PUBLICATIONS

WO2009/035262.*
(Continued)

*Primary Examiner* — Chuong T Ho
(74) *Attorney, Agent, or Firm* — Porter, Wright, Morris & Arthur, LLP

(57) ABSTRACT

The present invention discloses a method for acquiring a Packet Data Convergence Protocol (PDCP) status report and a packet data convergence protocol entity. The method comprises the steps of: a PDCP entity transmitting to an opposite PDCP entity a PDCP Protocol Data Unit (PDU) used to request the transmission of a PDCP status report; and the PDCP entity receiving the PDCP status report which is transmitted from the opposite PDCP entity according to the PDCP PDU. By the present invention, the quality of service and the performance of the wireless communication system are improved.

10 Claims, 9 Drawing Sheets

(56) References Cited

U.S. PATENT DOCUMENTS

| | | | |
|---|---|---|---|
| 8,411,619 B2 * | 4/2013 | Lee et al. | 370/328 |
| 2006/0251105 A1 | 11/2006 | Kim et al. | |
| 2008/0130580 A1 * | 6/2008 | Chaponniere et al. | 370/331 |
| 2009/0238142 A1 * | 9/2009 | Chun et al. | 370/331 |
| 2010/0110971 A1 * | 5/2010 | Kim et al. | 370/315 |
| 2011/0149905 A1 * | 6/2011 | Kim | 370/331 |

FOREIGN PATENT DOCUMENTS

| | | |
|---|---|---|
| WO | WO 2009096748 A2 | 8/2009 |
| WO | WO 2009099266 A1 | 8/2009 |

OTHER PUBLICATIONS

WO2009/038394.*

* cited by examiner

--Prior Art--

--Prior Art--

| D/C | PDU Type | FMS | Oct 1 |

| FMS (cont.) | Oct 2 |

| Bitmap₁ (optional) | Oct 3 |

...

| Bitmap_N (optional) | Oct 2+N |

--Prior Art--

--Prior Art--

| Bit | Description |
|---|---|
| 000 | PDCP status report |
| 001 | header compression feedback information |
| 010 | PDCP status request |
| 011-111 | reserve |

METHOD FOR ACQUIRING PACKET DATA CONVERGENCE PROTOCOL STATUS REPORT AND PACKET DATA CONVERGENCE PROTOCOL ENTITY

FIELD OF THE INVENTION

The present invention relates to the wireless communication field, in particular to a method for acquiring a Packet Data Convergence Protocol (PDCP) status report and a PDCP entity.

BACKGROUND OF THE INVENTION

In the Third Generation Partnership Projects (3GPP) and 3GPP Long-Term Evolution (LTE) system, there exists a PDCP layer in the air interface protocol stack of User Equipment (UE) and NodeB (eNB). FIG. 1 is a schematic diagram of protocol stack of LTE user plane according to the related art. As shown in FIG. 1, the PDCP protocol layer is over the Radio Link Control (RLC) layer, and provides data convergence services for high-layer user plane data (such as user IP packets) or control plane data (such as Radio Resource Control (RRC) message).

FIG. 2 is a functional and structural schematic diagram of the PDCP entity according to the related art, which, as shown in FIG. 2, includes a Transmitting PDCP entity and a Receiving PDCP entity, wherein the main functions of the PDCP layer include: providing Header Compression and Header Decompression functions for the user-plane (u-plane) data, namely, the PDCP performing data header compression using Robust Header Compression (RoHC) protocol of Internet Engineering Task Force (IETF); providing Ciphering and Deciphering functions for the u-plane data and control plane (c-plane) data; providing Integrity Protection and Integrity Verification functions of data for the c-plane data; and providing Sequence numbering and Re-ordering functions for high-layer data, and enabling lossless handover, in the event of handover.

The PDCP transmitting entity assigns a Sequence Number (SN) to a high-layer Protocol Data Unit (PDU), namely, PDCP Service Data Unit (SDU). FIG. 3 is a schematic diagram of the format of PDCP PDU data packet according to the related art. As shown in FIG. 3, the assignment of SN is performed according to Data Radio Bearer (DRB). However, for the control data within the protocol layer, such as RoHC feedback, Status Report, etc., no SN is assigned.

In the event of handover, for the services which are sensitive to packet loss (such as file transfer, which, among other services, is generally transmitted by RLC Acknowledged Mode (AM)); lossless handover can be ensured by exchanging PDCP status report between the PDCP layer entities of the UE and the eNB. FIG. 4 is a schematic diagram of the procedure of lossless handover according to the related art. As shown in FIG. 4, the procedure of lossless handover is described taking uplink data transmission as an example.

Step 401: the UE transmits PDCP PDU 1, 2, 3, 4, 5 to the source eNB. But for some reason, the PDU 3, 5 are not successfully received by the source eNB.

Step 402: the source eNB transmits RLC acknowledgement (ACK) of PDU 1, 2 to the UE RLC entity.

Step 403: the UE is handed over from the source eNB to the target eNB.

Step 404: the source eNB notifies the PDCP SN status to the target eNB by SN STATUS TRANSFER message through the X2 interface.

Step 405: the target eNB transmits a PDCP status report to the UE, wherein it is indicated in the PDCP status report that the First Missing Sequence (FMS) is 3.

Step 406: the UE retransmits the PDCP PDU 3, 4, 5 to the target eNB.

FIG. 5 is a schematic diagram of the format of a PDCP status report control PDU packet according to the related art. As shown in FIG. 5, the transmission mechanism in the existing PDCP status report has two problems:

1. the PDCP status report is only used in the event of handover; and for the UE which is not in the handover procedure, the PDCP SN status cannot be exchanged between the UE and the eNB. However, in fact, in the non-handover, failures may occur in the PDCP layer of the UE or the eNB, for example, a RoHC header decompression failure; or repeated transmission of data due to the loss of the RLC acknowledgement in air interface transmission. If the PDCP of the UE or the eNB can also exchange the PDCP status information in non-handover, it will be helpful for the PDCP entity in avoiding packet loss or repeated transmission of packets which have been successfully received.

2. the PDCP status report can only be decided by the PDCP entity of the UE or the eNB to transmit or not after a handover (the selection is non-mandatory), and if the PDCP status report is not transmitted, then the opposite PDCP layer could not get the PDCP status information.

In addition, the wireless Relay technology is introduced in the 3GPP LTE-Advanced (LTE-A) system, in order to extend the coverage area of the cell, reduce blind angles in communication, balance the load and transfer the services of hot spots. FIG. 6 is a schematic diagram of the network structure into which a wireless relay node is introduced, according to the related art. As shown in FIG. 6, new Relay-Nodes (RNs) are added between the Donor-eNB and the UE, these new RNs are wirelessly connected with the Donor-eNB, and have no wired connection with the transmission network, wherein the air interface between the Donor-eNB and the RN is referred to as Un interface, and the wireless link between the Donor-eNB and the RN is referred to as Backhaul Link; and the air interface between the RN and the UE is referred to as Uu interface, and the link between the RN and the UE is referred to as Access Link. The downlink data reaches the Donor-eNB first, then is transmitted to the RN, and then is transmitted to the UE by RN, and reversed situation is applicable to the uplink data.

The PDCP data transmission of the UE under the RN is achieved through two parts, the first part is among the PDCP entities at the Uu interface, and the second part is among the PDCP entities at the Un interface. When a handover occurs to the UE served by the RN, considering the above mentioned lossless handover procedure, at the moment, the PDCP status transmitted between the RN and the target eNB only contains the SN status information among the PDCP entities of the first part, and the PDCP status transmitted among the PDCP entities of the second part (RN-Donor eNB) is not available in the existing mechanism. Therefore, during the handover procedure, the packet lost due to transmission errors in the second part cannot be re-transmitted in the target eNB.

In addition to the problem of inaccurate PDCP SN status information in the handover in the Relay scene, there is a new problem in the handover in the Relay scenario, and the new problem lies at the repeated data forwarding between the Relay and the Donor eNB during the handover procedure. When the UE served by one Relay is switched to the Donor eNB or other neighboring eNB, the Relay needs to forward the data (for the data in the RLC unacknowledged mode (UM), the data herein indicates data that has not been transmitted downwards yet; and for the data in the RLC AM mode, the data herein indicates data that has not received the RLC ACK yet), which has not been transmitted successfully, to the Donor eNB through an X2 interface. Since the data is originally transmitted to the Relay by the Donor eNB through the Un interface, and now needs to be transmitted from the Relay back to the Donor eNB, in consideration of the fact that the UE handover under the Relay may be relatively frequent, this unnecessary data forwarding is the resources waste of the Un air interface. One solution is: after successfully transmitting the PDCP data packet in the Un interface, the Donor eNB does not immediately delete the PDCP data packet from the buffer area, but wait until the Relay has successfully transmitted the PDCP data packet to the UE, which requires flexible exchange of the PDCP SN status information between the Relay and the Donor eNB.

In regard to the problem of packet loss and data retransmission due to the PDCP entity transmission errors in the related art, no effective solution has been proposed so far.

SUMMARY OF THE INVENTION

The present invention is provided considering the problem of packet loss and data retransmission due to the PDCP entity transmission errors in the related art. Thus, the main object of the present invention is to provide a solution for acquiring a PDCP status report to solve at least one of the above problems.

In order to achieve the above purpose, according to one aspect of the present invention, a method for acquiring a PDCP status report is provided.

The method for acquiring a PDCP status report according to the present invention comprises the step of: a PDCP entity transmitting to an opposite PDCP entity a PDCP Protocol Data Unit (PDU) used to request the transmission of a PDCP status report; and the PDCP entity receiving the PDCP status report which is transmitted from the opposite PDCP entity according to the PDCP PDU.

Preferably, in the case that the PDCP PDU is a PDCP Data PDU, before the PDCP entity transmitting to the opposite PDCP entity the PDCP Data PDU, the method further comprises: setting an identifier bit in the header of the PDCP Data PDU, and setting the identifier bit as being valid, wherein when the identifier bit is valid, it indicates that the PDCP Data PDU is used to request from the opposite PDCP entity the transmission of a PDCP status report.

Preferably, the PDCP entity sets one bit of the reserved bits in the header of the PDCP Data PDU as the identifier bit.

Preferably, in the case that the PDCP entity is in a user equipment and the opposite PDCP entity is in the target eNB, during the handover procedure of the user equipment being handed over from the source eNB to the target eNB, the step of setting an identifier bit in the header of the PDCP Data PDU further comprises: the user equipment setting the identifier bit with a valid value in the header of the PDCP Data PDU which conveys an RRC connection reconfiguration complete message.

Preferably, in the case that the PDCP PDU is a PDCP Control PDU, before the PDCP entity transmitting to the opposite PDCP entity the PDCP Control PDU, the method further comprises: the PDCP entity setting the PDU type as a PDCP status report request in the header of the PDCP Control PDU, wherein the PDU type being the PDCP status report request is used to request from the opposite PDCP entity the transmission of a PDCP status report.

Preferably, the PDCP entity sets one of the reserved values of the PDU type in the header of the PDCP Control PDU as a PDCP status report request.

Preferably, in the case that the PDCP entity is in a user equipment and the opposite PDCP entity is in the target eNB, during the handover procedure of the user equipment being handed over from the source eNB to the target eNB, the step of the PDCP entity setting the PDU type as a PDCP status report request in the header of the PDCP Control PDU further comprises: the user equipment setting the PDU type as a PDCP status report request in the header of the PDCP Control PDU.

Preferably, in the case that the PDCP entity is in a relay node and the opposite PDCP entity is in a donor-eNB, during the handover procedure of the user equipment being handed over from the relay node to the target eNB, the step of the PDCP entity transmitting to the opposite PDCP entity the PDCP PDU further comprises: the relay node transmitting the PDCP PDU to the donor-eNB, so as to acquire the PDCP status report from the donor-eNB.

In order to achieve the above purpose, according to another aspect of the present invention, a PDCP entity is further provided.

The PDCP entity according to the present invention comprises: a transmitting module, configured to transmit to the opposite PDCP entity a PDCP Protocol Data Unit (PDU), wherein the PDCP PDU is used to request from the opposite PDCP the transmission of a PDCP status report; and a receiving module, configured to receive the PDCP status report which is transmitted from the opposite PDCP entity according to the PDCP PDU.

Preferably, the PDCP entity further comprises: a first setting module, configured to set an identifier bit in the header of a PDCP Data PDU in the case that the PDCP PDU is the PDCP Data PDU, wherein when the identifier bit is valid, it indicates that the PDCP Data PDU is used to request from the opposite PDCP entity the transmission of a PDCP status report.

Preferably, the PDCP entity further comprises: a second setting module, configured to set the PDU type as a PDCP status report request in the header of a PDCP Control PDU in the case that the PDCP PDU is the PDCP Control PDU, wherein the PDU type being the PDCP status report request is used to request from the opposite PDCP entity the transmission of a PDCP status report.

By the present invention in which a PDCP entity requests the opposite PDCP entity to transmit a PDCP status report, and the PDCP entity can accurately know the status of the opposite PDCP entity when necessary, which solves the problem of packet loss and data retransmission problems due to the PDCP entity transmission errors, and improves the quality of service and the performance of the wireless communication system.

BRIEF DESCRIPTION OF THE ACCOMPANYING DRAWINGS

The drawings illustrated here provide a further understanding of the present invention and form a part of the present application. The exemplary embodiments and the description thereof are used to explain the present invention without unduly limiting the scope of the present invention. In drawings.

DETAILED DESCRIPTION OF THE PREFERRED EMBODIMENTS

Figure 1:
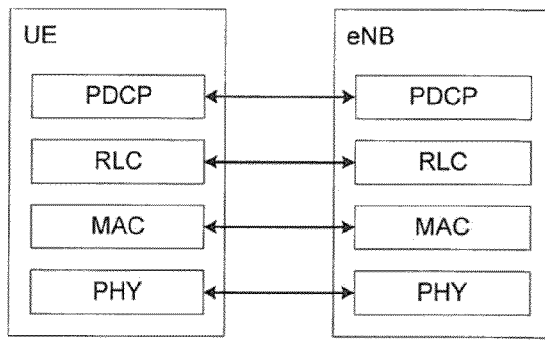
FIG. 1 is a schematic diagram of protocol stack of LTE user plane according to the related art.
Figure 2:
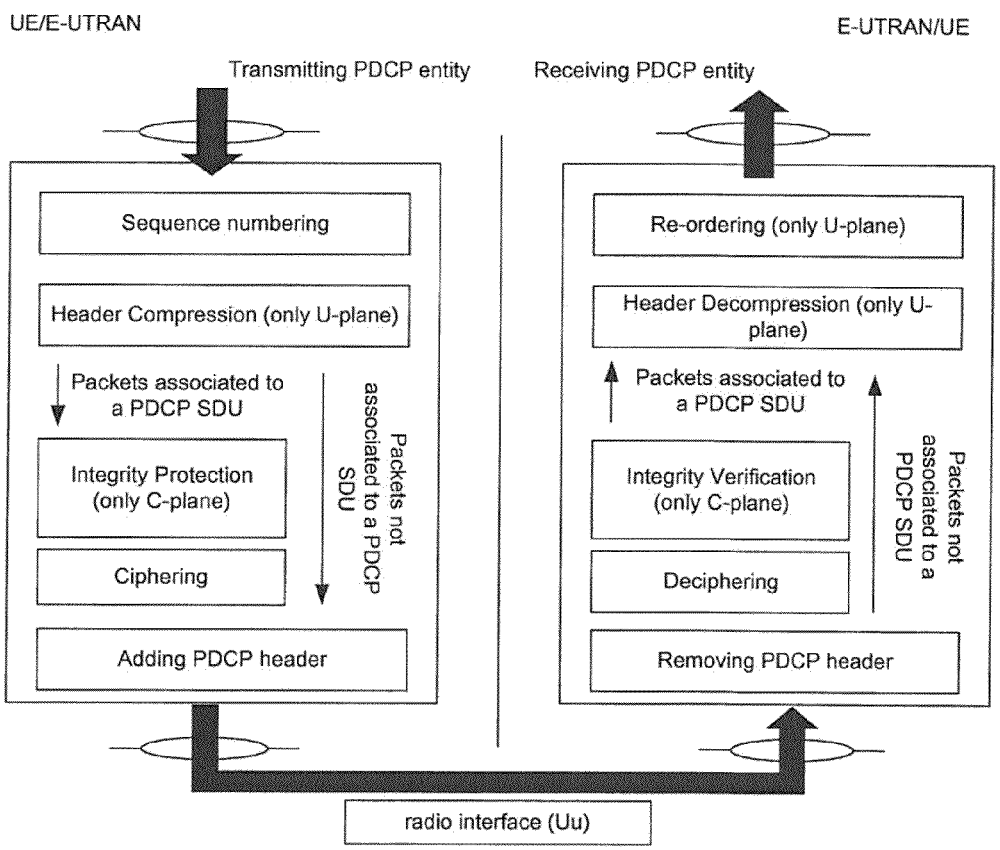
FIG. 2 is a functional and structural schematic diagram of the PDCP entity according to the related art.
Figure 3:
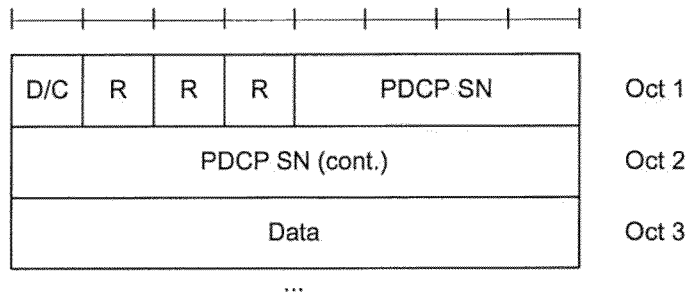
FIG. 3 is a schematic diagram of the format of PDCP PDU data packet according to the related art.
Figure 4:
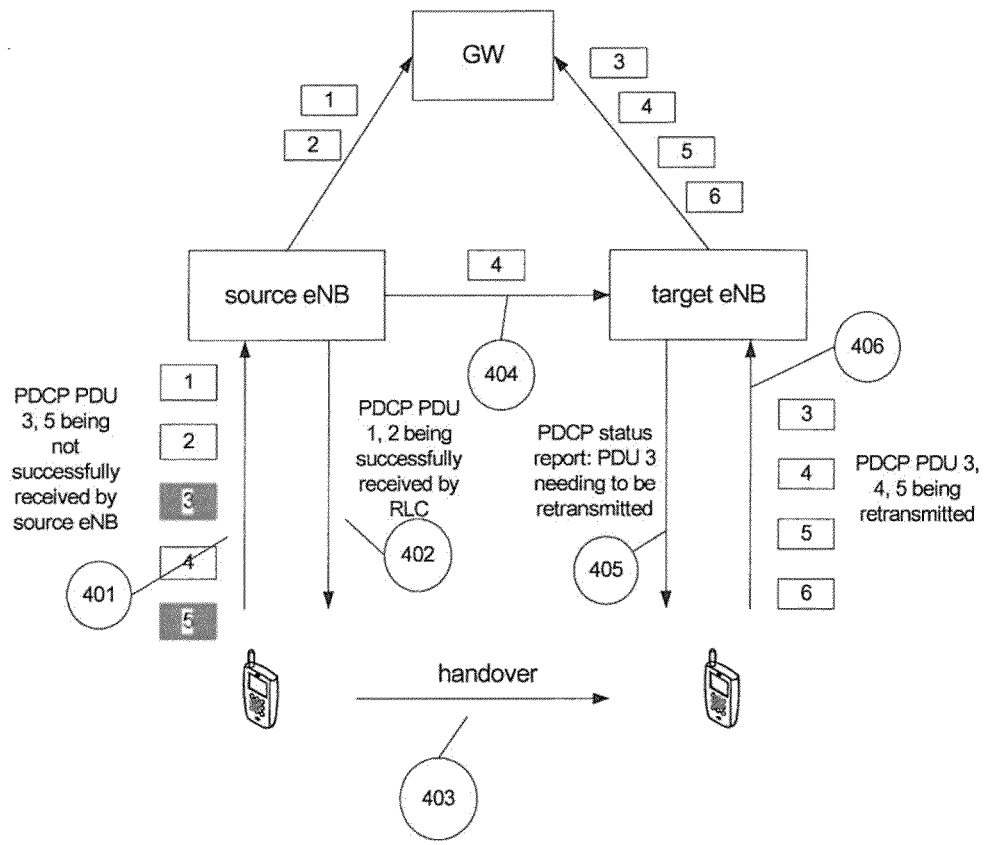
FIG. 4 is a schematic diagram of the procedure of lossless handover according to the related art.
Figures 5, 6:
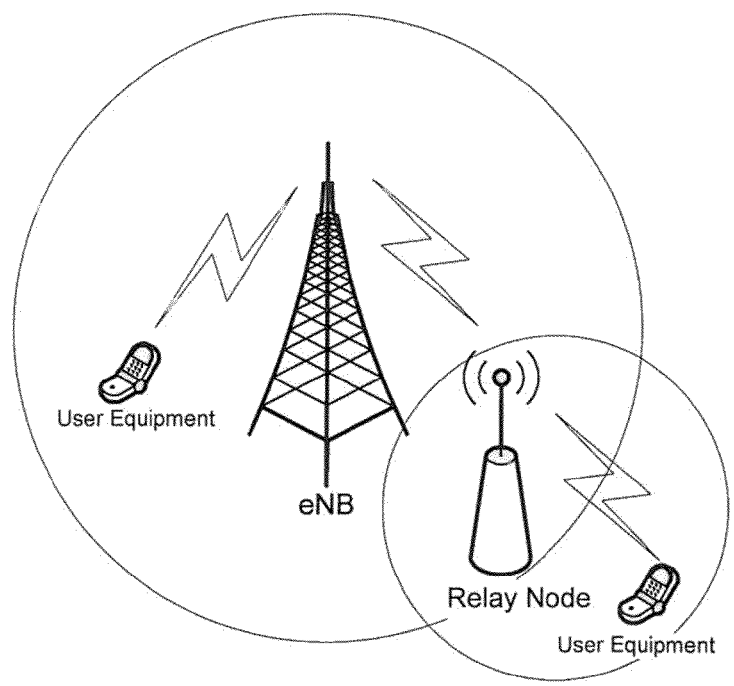
FIG. 5 is a schematic diagram of the format of a PDCP status report control PDU packet according to the related art.
FIG. 6 is a schematic diagram of the network structure into which a wireless relay node is introduced according to the related art.

It should be noted that the embodiments and the features of the embodiments in the present application can be combined with each other under the circumstances that there is no conflict. The present invention is described in detail with reference to the accompanying drawings and in combination with the embodiments hereinafter.

In the following embodiments, the step shown in the flowcharts in the drawings can be executed in a computer system such as a set of computer executable instructions, and although the logical order is shown in the flowcharts, the steps shown or described can be executed in an order different from this in some circumstances.

In the following embodiments, considering the problem of packet loss and data retransmission due to the PDCP entity transmission errors in the related art, a solution for acquiring a PDCP status report is provided, which comprises: a PDCP entity transmitting to an opposite PDCP entity a PDCP protocol data unit used to request the transmission of a PDCP status report from the opposite PDCP entity; and the PDCP entity receiving the PDCP status report which is transmitted from the opposite PDCP entity according to the PDCP protocol data unit.

Figure 7:
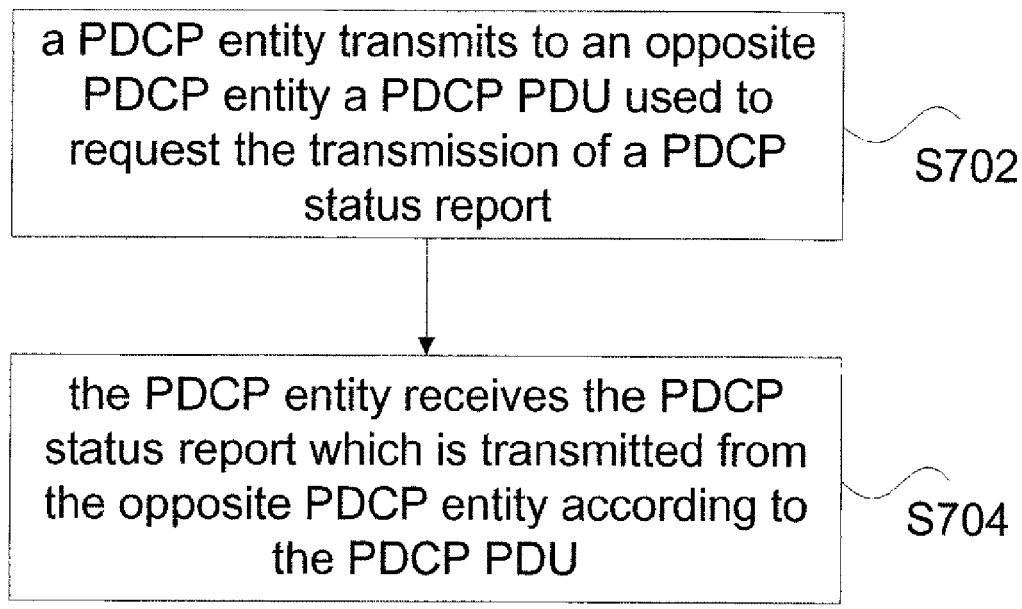
FIG. 7 is a flowchart of the method for acquiring a PDCP status report according to an embodiment of the present invention.

FIG. 7 is a flowchart of the method for acquiring a PDCP status report according to an embodiment of the present invention. As shown in FIG. 7, the method comprises Step S702 to Step S704 as follows.

Step S702, a PDCP entity transmits to an opposite PDCP entity a PDCP PDU used to request the transmission of a PDCP status report.

Step S704, the PDCP entity receives the PDCP status report which is transmitted from the opposite PDCP entity according to the PDCP PDU.

By the above steps, the request transmission mechanism of the PDCP status report is added, such that the PDCP entity can accurately know the status of the opposite PDCP entity when necessary, which solves the problem of packet loss and data retransmission due to the PDCP entity transmission errors.

Preferably, in the implementation, the PDCP PDU includes a PDCP Data PDU and a PDCP Control PDU, wherein the PDCP Data PDU indicates that the PDU conveys the user data, and the PDCP Control PDU indicates that the PDU is the control information between the PDCP entities, including a PDCP status report, an RoHC feedback etc.

Preferably, in the case that the PDCP PDU is a PDCP Data PDU, before step S702, an identifier bit is set in the header of the PDCP Data PDU, and the identifier bit is set as being valid, wherein when the identifier bit is valid, it indicates that the PDCP Data PDU is used to request the transmission of a PDCP status report from the opposite PDCP entity. Preferably, the PDCP entity sets one bit of the reserved bits in the header of the PDCP Data PDU as the identifier bit. Specifically, in the case that the PDCP entity is in a user equipment and the opposite PDCP entity is in the target eNB, during the handover procedure of the user equipment being handed over from the source eNB to the target eNB, the step of setting an identifier bit in the header of the PDCP Data PDU further comprises: the user equipment setting the identifier bit with a valid value in the header of the PDCP Data PDU which conveys an RRC connection reconfiguration complete message.

Preferably, in the case that the PDCP PDU is a PDCP Control PDU, before step S702, the PDCP entity sets the PDU type as a PDCP status report request in the header of the PDCP Control PDU, wherein the PDU type being the PDCP status report request is used to request the transmission of a PDCP status report from the opposite PDCP entity. Preferably, the PDCP entity sets one of the reserved values of the PDU type in the header of the PDCP Control PDU as a PDCP status report request. Specifically, in the case that the PDCP entity is in the user equipment and the opposite PDCP entity is in the target eNB, during the handover procedure of the user equipment being handed over from the source eNB to the target eNB, the step of the PDCP entity setting the PDU type as a PDCP status report request in the header of the PDCP Control PDU further comprises: the user equipment setting the PDU type as a PDCP status report request in the header of the PDCP Control PDU.

Preferably, in the case that the PDCP entity is in a relay node and the opposite PDCP entity is in a donor-eNB, during the handover procedure of the user equipment being handed over from the relay node to the target eNB, the step of the PDCP entity transmitting to the opposite PDCP entity the PDCP PDU used to request the transmission of the PDCP status report from the opposite PDCP entity further comprises: the relay node transmitting the PDCP PDU to the donor-eNB, so as to acquire the PDCP status report from the donor-eNB.

The present invention is described as follows in conjunction with the preferred embodiments.

Preferred Embodiment 1

Figure 8:
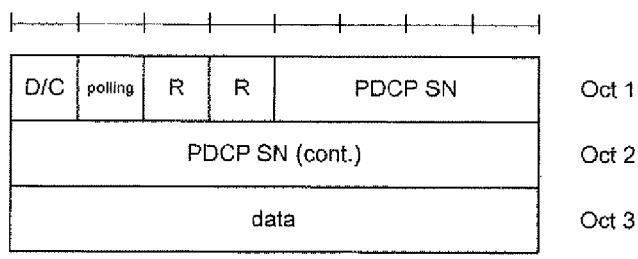
FIG. 8 is a preferred schematic diagram of adding newly a "polling" bit in the header of the PDCP PDU according to the preferred Embodiment 1 of the present invention.

The present embodiment shows that, during an ordinary handover procedure, after accomplishing access to the target eNB, the UE requests the target eNB to transmit a PDCP Status Report by setting Polling bit in the header of the PDCP PDU, so as to ensure the lossless handover. Specifically, it is implemented by using one of the three reserved bits in the header of the current PDCP PDU as a "Polling" bit. FIG. 8 is a preferred schematic diagram of adding newly a "polling" bit in the header of the PDCP PDU according to the preferred Embodiment 1 of the present invention. As shown in FIG. 8, when the bit is "1", the PDCP entity which receives the PDU constructs a "PDCP status report" control PDU and transmits it to the opposite PDCP entity; and when the bit is "0", the PDCP status report is not transmitted.

Figure 9:
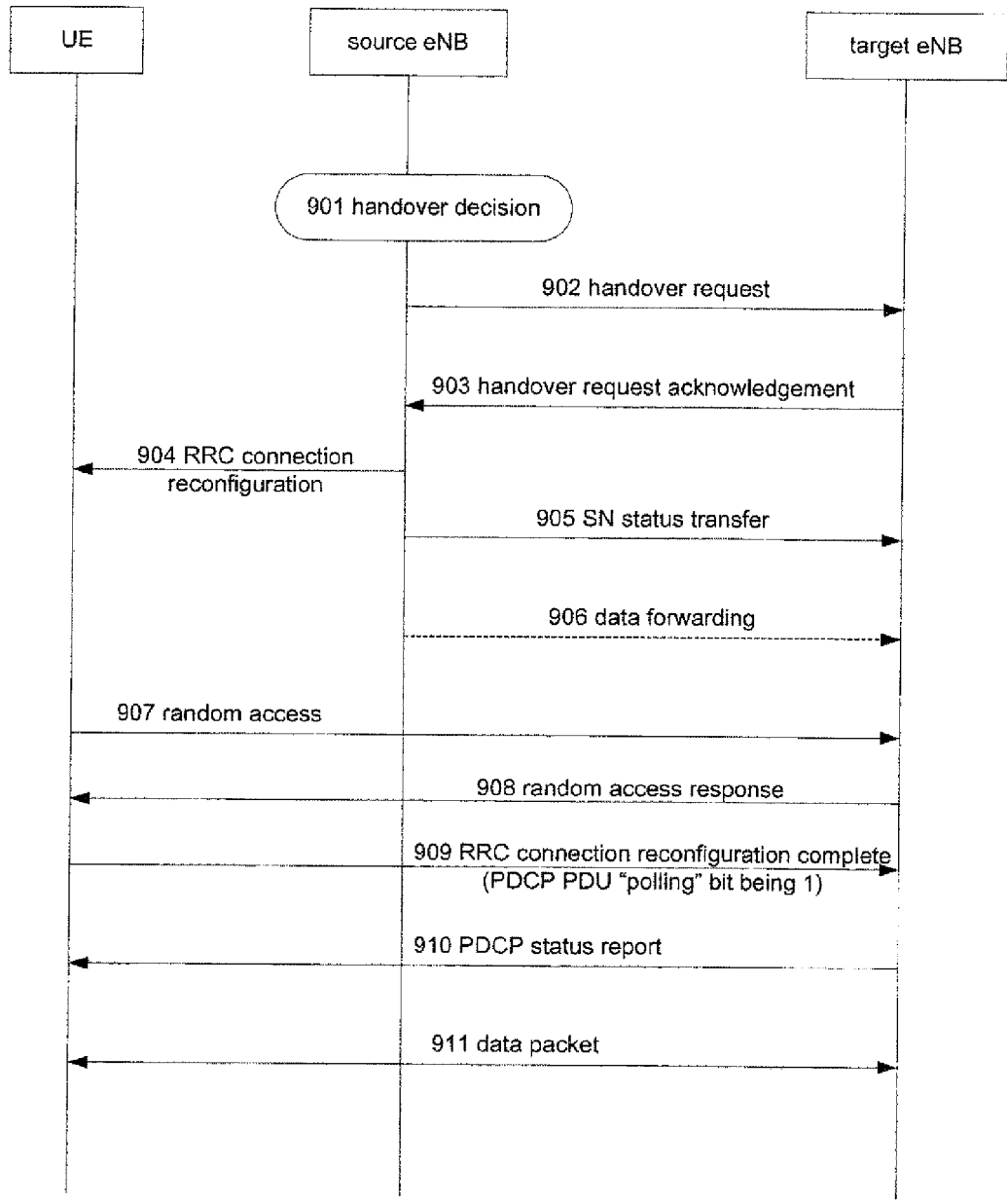
FIG. 9 is a schematic diagram of the method for acquiring a PDCP status report according to the preferred Embodiment 1 of the present invention.

FIG. 9 is a schematic diagram of the method for acquiring a PDCP status report according to the preferred Embodiment 1 of the present invention. As shown in FIG. 9, step 901, the source eNB makes a Handover Decision, namely, the Source eNB decides to hand the UE over to the Target eNB according to a measurement report from the UE;

step 902, the source eNB sends a Handover Request message to the Target eNB, wherein the message contains the information that the Target eNB needs to prepare for the handover;

step 903, after accomplishing the handover preparation, the Target eNB sends a Handover Request ACK message to the Source eNB;

step 904, after receiving the Handover Request ACK, the source eNB generates an RRC Connection Reconfiguration message and sends the message to the UE, wherein the message carries a mobilityControlInformation Information element (IE); in addition, the RRC Connection Reconfiguration message contains the information that is necessary for the UE to perform the handover;

step 905, the source eNB sends the SN Status Transfer message to the target eNB, wherein the message contains the uplink PDCP SN receiver status and the downlink PDCP SN transmitter status;

step 906, the source eNB forwards the data in the buffer to the target eNB, namely, Data Forwarding, and this step may also be started immediately after step 1103 or step 1104;

step 907, the UE initiates a Random Access process to the target eNB, wherein the random access may be non-competitive;

step 908, the target eNB sends a Random Access Response message to the UE;

step 909, the UE sends an RRC Connection Reconfiguration Complete message to the target eNB, and sets the "Polling" bit as 1 in the header of the PDCP PDU which conveys the RRC message;

step 910, after detecting the polling bit in the header of the PDCP PDU, the target eNB sends the PDCP Status Report to the UE; and step 911, after receiving the PDCP Status Report, the UE starts to transmit the Packet Data to the target eNB, according to the PDCP SN status information therein.

Preferred Embodiment 2

Figures 10, 11:
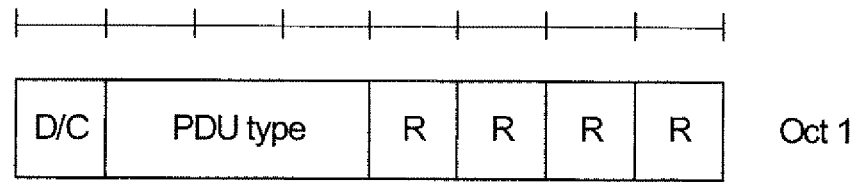
FIG. 10 is a preferred schematic diagram of the format of a newly added "PDCP Status Request" control PDU packet according to the preferred Embodiment 2 of the present invention.
FIG. 11 is a schematic diagram of the preferred value assignment of the PDU type of a newly added "PDCP Status Request" control PDU packet according to the preferred Embodiment 2 of the present invention.

The present embodiment shows that, during an ordinary handover procedure, after accomplishing access to the target eNB, the UE requests the target eNB to transmit a PDCP Status Report by sending a "PDCP Status Request" control PDU, so as to ensure the lossless handover. Specifically, a new control PDU, namely, PDCP Status Request, is added to the PDCP protocol. When a PDCP entity needs to know the status information of the opposite PDCP, the PDCP entity transmits the PDCP status report request PDU to the opposite PDCP, and the PDCP entity which receives the PDCP status report request PDU would generate a "PDCP status report" control PDU and sends it back to the opposite PDCP entity. FIG. 10 is a preferred schematic diagram of the format of a newly added "PDCP Status Request" control PDU packet according to the preferred Embodiment 2 of the present invention, and FIG. 11 is a schematic diagram of the preferred value assignment of the PDU type of a newly added "PDCP Status Request" control PDU packet (or referred to as the PDCP status report request) according to the preferred Embodiment 2 of the present invention. What is shown in FIG. 10 and FIG. 11 is a preferred PDCP Status Request packet format.

Figure 12:
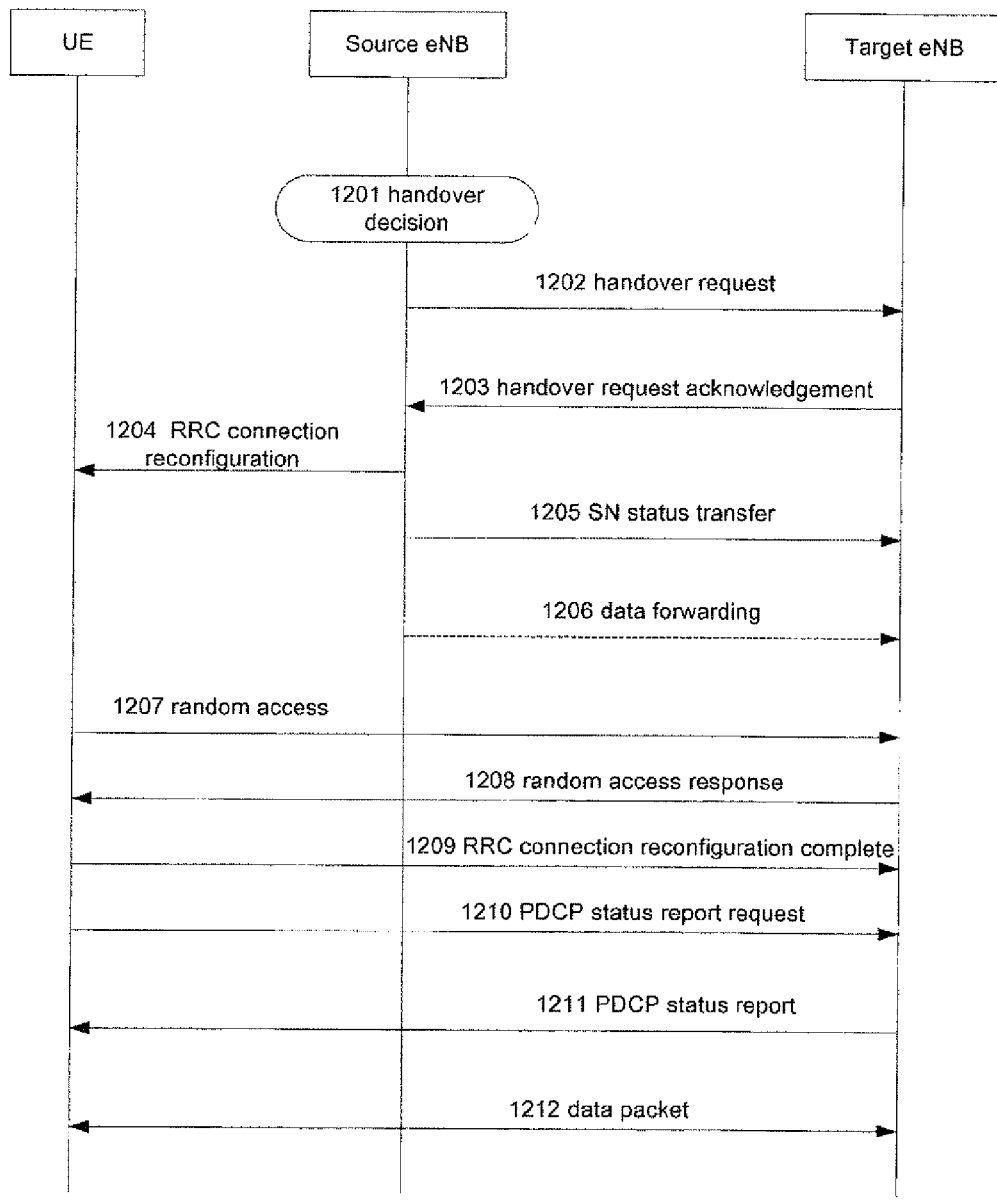
FIG. 12 is a schematic diagram of the method for acquiring the PDCP status report according to the preferred Embodiment 2 of the present invention.

FIG. 12 is a schematic diagram of the method for acquiring the PDCP status report according to the preferred Embodiment 2 of the present invention. As shown in FIG. 12, step 1201, the source eNB makes a Handover Decision, namely, the Source eNB decides to hand the UE over to the Target eNB according to a measurement report from the UE;

step 1202, the source eNB sends a Handover Request message to the Target eNB, wherein the message contains the information that the Target eNB needs to prepare for the handover;

step 1203, after accomplishing the handover preparation, the Target eNB sends a Handover Request ACK message to the Source eNB;

step 1204, after receiving the Handover Request ACK, the source eNB generates an RRC Connection Reconfiguration message and sends the message to the UE, wherein the message carries a mobilityControlInformation IE; in addition, the RRC Connection Reconfiguration message contains the information that is necessary for the UE to perform the handover;

step 1205, the source eNB transmits the SN Status Transfer message to the target eNB, wherein the message contains the uplink PDCP SN receiver status and the downlink PDCP SN transmitter status;

step 1206, the source eNB forwards the data in the buffer to the target eNB, namely, Data Forwarding, and this step may also be started immediately after step 1203 or step 1204;

step 1207, the UE initiates a Random Access process to the target eNB, wherein the random access may be non-competitive;

step 1208, the target eNB sends a Random Access Response message to the UE;

step 1209, the UE sends an RRC Connection Reconfiguration Complete message to the target eNB;

step 1210, before starting to send the data, the UE transmits the PDCP Status Request Control PDU to the target eNB;

step 1211, after receiving the PDCP Status Request Control PDU, the target eNB transmits the PDCP Status Report to the UE; and step 1212, after receiving the PDCP Status Report, the UE starts to transmit the Packet Data to the target eNB, according to the PDCP SN status information therein.

By the method for acquiring the PDCP status report, the PDCP entity of the UE or the eNB can request the transmission of a PDCP SN status report from the opposite PDCP entity, and the PDCP entity can accurately know the SN status of the opposite PDCP entity when necessary, so that the missing PDCP PDU packet can be retransmitted in the case that the SN status is abnormal (for example some PDCP SNs loss), or the unnecessary data retransmission can be prevented by the PDCP SN status report, which thereby improves the quality of service.

Preferred Embodiment 3

The present embodiment shows that, during a handover procedure in the Relay scenario, the Relay requests the Donor eNB to transmit a PDCP Status Report by setting Polling bit in the header of the PDCP PDU transmitted to the Donor eNB or directly transmitting the PDCP Status Request control PDU, and at the same time, the Relay maps the PDCP Status Report on the Un interface to the corresponding PDCP SN status on the Uu interface, and based on the PDCP SN status of itself, so as to provide more accurate PDCP SN status information to the target eNB.

Figure 13:
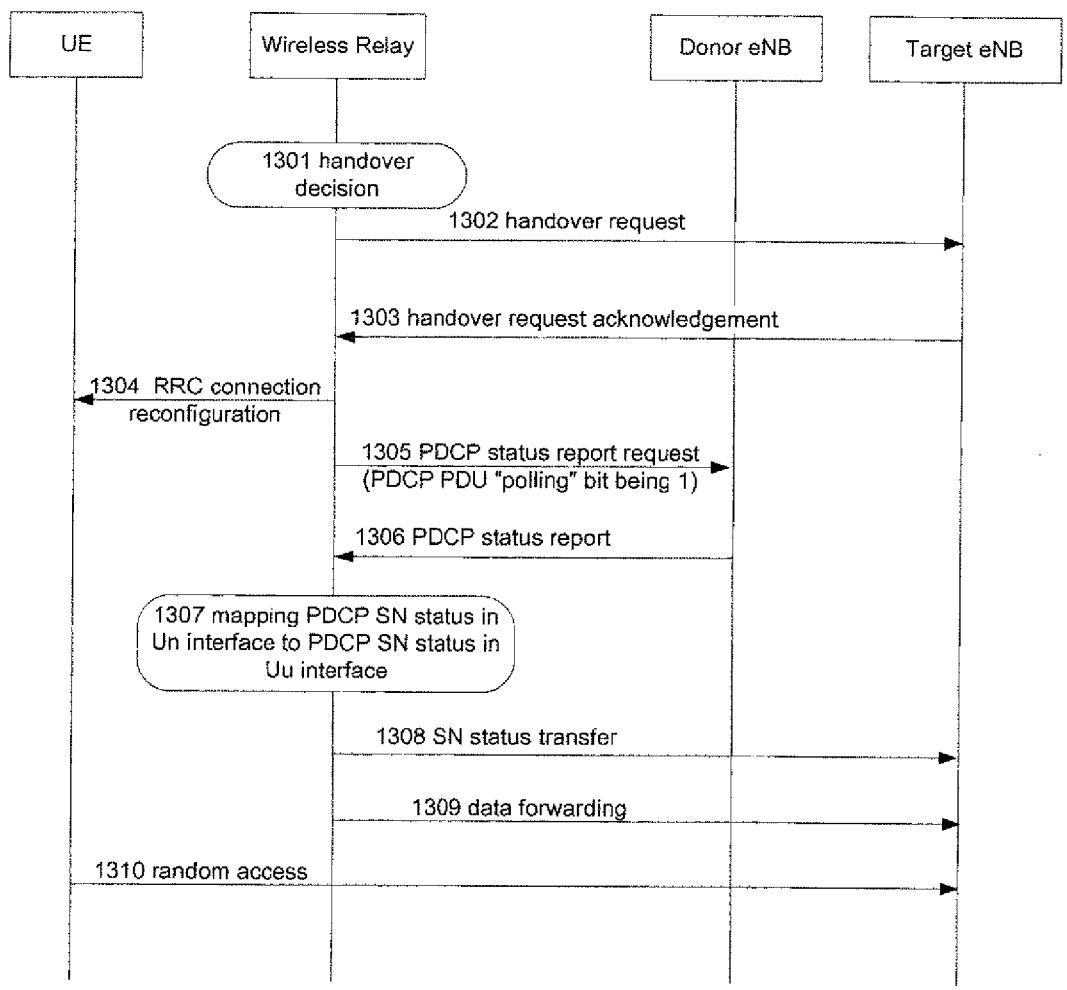
FIG. 13 is a schematic diagram of the method for acquiring the PDCP status report according to the preferred Embodiment 3 of the present invention.

FIG. 13 is a schematic diagram of the method for acquiring the PDCP status report according to the preferred Embodiment 3 of the present invention. As shown in FIG. 13, step 1301, the Relay makes a Handover Decision, namely, the Relay decides to hand the UE over to the Target eNB according to a measurement report from the UE;

step 1302, the Relay sends a Handover Request message to the Target eNB, wherein the message contains the information that the Target eNB needs to prepare for the handover;

step 1303, after accomplishing the handover preparation, the Target eNB sends a Handover Request ACK message to the Relay;

step 1304, after receiving the Handover Request ACK, the Relay generates an RRC Connection Reconfiguration message and sends the message to the UE, wherein the message carries a mobilityControlInformation IE; in addition, the RRC Connection Reconfiguration message contains the information that is necessary for the UE to perform the handover;

step 1305, the Relay sends the PDCP Status Request message to the Donor eNB (or sets the polling bit as 1 in the header of the uplink PDCP PDU);

step 1306, the Donor eNB transmits the PDCP Status Report to the Relay, wherein the status report contains the uplink and downlink PDCP SN status information of the PDCP entity on the Un interface;

step 1307, after receiving the PDCP status reported on the Un interface, the Relay maps the PDCP SN status information on the Un interface in the report to the corresponding PDCP SN status information on the Uu interface. It should be noted that, as the PDCP data packets on the Uu interface are usually reused as the PDCP data on the Un interface by a certain way, the mapping relation between the PDCP SN on the Uu interface and the corresponding PDCP SN on the Un interface is reserved in the Relay;

step 1308, the Relay transmits an SN Status Transfer message to the target eNB, wherein the SN status information in the message reflects the data transmitting/receiving situation of the PDCP entities on both the Uu interface and the Un interface, that is, some PDCP data SNs missing in the Un interface are included in the SN Status Transfer message as well, so that the target eNB can transmit more accurate PDCP Status Report to a UE after the access of the UE, which thereby ensures lossless handover;

step 1309, the Relay forwards the data in the buffer to the target eNB, namely, Data Forwarding; and step 1310, the UE initiates a Random Access procedure to the target eNB, the following steps are the same as the above handover procedure, and no further description is given here.

In the handover in the Relay scenario, the method of the embodiment of the present invention enables more accurate transmission of the PDCP SN status information between the Relay and the target eNB, so as to realize lossless handover, and at the same time, to help preventing repeated data forwarding between the Relay and the Donor eNB during the handover procedure.

Figure 14:
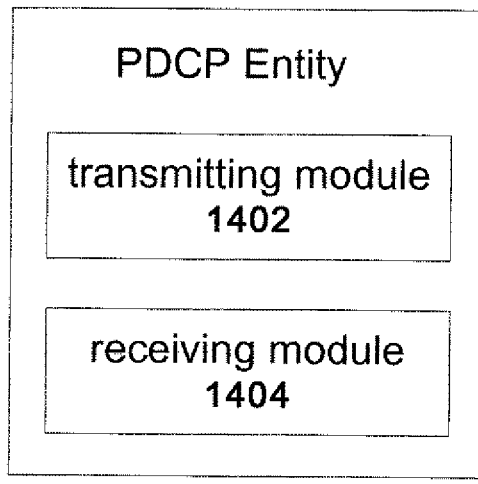
FIG. 14 is a structural block diagram of the PDCP entity according to an embodiment of the present invention.

In another embodiment, a PDCP entity is provided, which can realize the above embodiments and the preferred implementation manners thereof. The descriptions that have already been given are not repeated here. Herein the PDCP entity can be in a user equipment, an eNB or a relay node. The modules of the device are described as follows. FIG. 14 is a structural block diagram of the PDCP entity according to an embodiment of the present invention. As shown in FIG. 14, the PDCP entity comprises a transmitting module 1402 and a receiving module 1404. The structure is described in detail as follows.

The transmitting module 1402, configured to transmit to the opposite PDCP entity a PDCP PDU, wherein the PDCP PDU is used to request the transmission of a PDCP status report from the opposite PDCP, The receiving module 1404, configured to receive the PDCP status report which is transmitted from the opposite PDCP entity according to the PDCP PDU.

Figure 15:
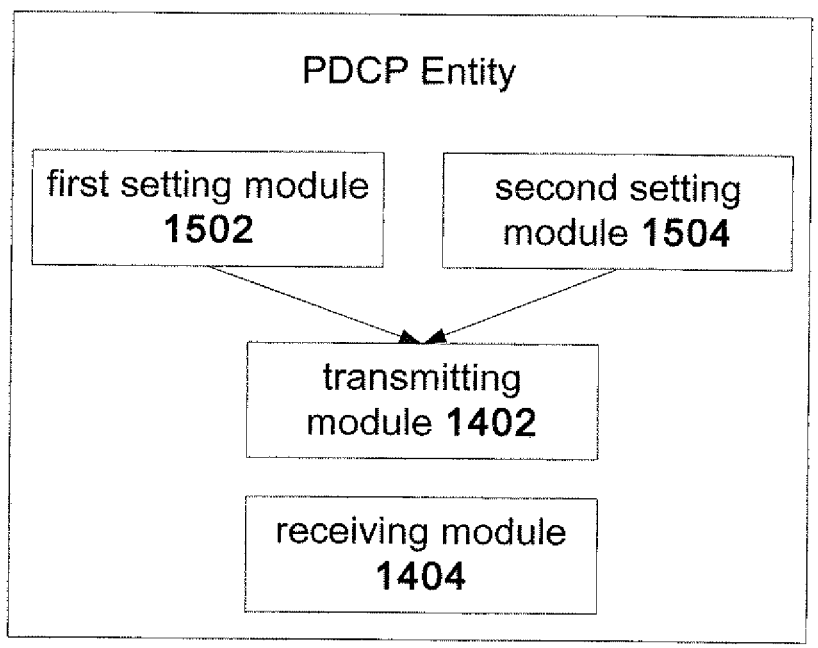
FIG. 15 is a preferred structural block diagram of the PDCP entity according to an embodiment of the present invention.

FIG. 15 is a preferred structural block diagram of the PDCP entity according to an embodiment of the present invention. As shown in FIG. 15, the PDCP entity further comprises: a first setting module 1502, connected to the transmitting module 1402, configured to set an identifier bit in the header of the PDCP Data PDU in the case that the PDCP PDU is a PDCP Data PDU, wherein when the identifier bit is valid, it indicates that the PDCP Data PDU is used to request the transmission of a PDCP status report from the opposite PDCP entity.

Preferably, as shown in FIG. 15, the PDCP entity further comprises: a second setting module 1504, connected to the transmitting module 1402, configured to set the PDU type as a PDCP status report request in the header of a PDCP Control PDU in the case that the PDCP PDU is the PDCP Control PDU, wherein the PDU type being the PDCP status report request is used to request the transmission of a PDCP status report from the opposite PDCP entity.

Owing to the above mentioned, by the above embodiments of the present invention, in which a PDCP entity requests the opposite PDCP entity to transmit a PDCP status report, namely, adding a requesting transmission mechanism of a PDCP status report, the PDCP entity can accurately know the status of the opposite PDCP entity when necessary, which solves the problem of packet loss and data retransmission due to the PDCP entity transmission errors, and improves the quality of service and the performance of the wireless communication system.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only preferable embodiments of the present invention, which are not used to restrict the present invention. For those skilled in the art, the present invention may have various changes and variations. Any amendments, equivalent substitutions, improvements and etc. within the spirit and principle of the present invention are all included in the scope of the claims of the present invention.

What is claimed is:

1. A method for acquiring a Packet Data Convergence Protocol (PDCP) status report, comprising the steps of:

a PDCP entity transmitting to an opposite PDCP entity a PDCP Protocol Data Unit (PDU) used to request the transmission of a PDCP status report; and the PDCP entity receiving the PDCP status report which is transmitted from the opposite PDCP entity according to the PDCP PDU;

wherein in the case that the PDCP entity is in a relay node and the opposite PDCP entity is in a donor-eNB, during the handover procedure of the user equipment being handed over from the relay node to the target eNB, the step of the PDCP entity transmitting to the opposite PDCP entity the PDCP PDU further comprises:

the relay node transmitting the PDCP PDU to the donor-eNB, so as to acquire the PDCP status report from the donor-eNB.

2. The method according to claim 1, wherein in the case that the PDCP PDU is a PDCP Data PDU, before the PDCP entity transmitting to the opposite PDCP entity the PDCP Data PDU, the method further comprises:

setting an identifier bit in the header of the PDCP Data PDU, and setting the identifier bit as being valid, wherein when the identifier bit is valid, it indicates that the PDCP Data PDU is used to request from the opposite PDCP entity the transmission of a PDCP status report.

3. The method according to claim 2, wherein the PDCP entity sets one bit of the reserved bits in the header of the PDCP Data PDU as the identifier bit.

4. The method according to claim 2, wherein in the case that the PDCP entity is in a user equipment and the opposite PDCP entity is in the target eNodeB (eNB), during the handover procedure of the user equipment being handed over from the source eNB to the target eNB, the step of setting an identifier bit in the header of the PDCP Data PDU further comprises:

the user equipment setting the identifier bit with a valid value in the header of the PDCP Data PDU which conveys a Radio Resource Control (RRC) reconfiguration complete message.

5. The method according to claim 1, wherein in the case that the PDCP PDU is a PDCP Control PDU, before the PDCP entity transmitting to the opposite PDCP entity the PDCP Control PDU, the method further comprises:

the PDCP entity setting the PDU type as a PDCP status report request in the header of the PDCP Control PDU, wherein the PDU type being the PDCP status report request is used to request from the opposite PDCP entity the transmission of a PDCP status report.

6. The method according to claim 5, wherein the PDCP entity sets one of the reserved values of the PDU type in the header of the PDCP Control PDU as a PDCP status report request.

7. The method according to claim 5, wherein in the case that the PDCP entity is in a user equipment and the opposite PDCP entity is in the target eNB, during the handover procedure of the user equipment being handed over from the source eNB to the target eNB, the step of the PDCP entity setting the PDU type as a PDCP status report request in the header of the PDCP Control PDU further comprises:

the user equipment setting the PDU type as a PDCP status report request in the header of the PDCP Control PDU.

8. A Packet Data Convergence Protocol (PDCP) entity, comprising:

a transmitting module, configured to transmit to the opposite PDCP entity a PDCP Protocol Data Unit (PDU), wherein the PDCP PDU is used to request from the opposite PDCP the transmission of a PDCP status report; and a receiving module, configured to receive the PDCP status report which is transmitted from the opposite PDCP entity according to the PDCP PDU;

wherein in the case that the PDCP entity is in a relay node and the opposite PDCP entity is in a donor-eNB, during the handover procedure of the user equipment being handed over from the relay node to the target eNB, the transmitting module is further configured to transmit the PDCP PDU to the donor-eNB, so as to acquire the PDCP status report from the donor-eNB.

9. The PDCP entity according to claim 8, further comprising:

a first setting module, configured to set an identifier bit in the header of a PDCP Data PDU in the case that the PDCP PDU is the PDCP Data PDU, wherein when the identifier bit is valid, it indicates that the PDCP Data PDU is used to request from the opposite PDCP entity the transmission of a PDCP status report.

10. The PDCP entity according to claim 8, further comprising:

a second setting module, configured to set the PDU type as a PDCP status report request in the header of a PDCP Control PDU in the case that the PDCP PDU is the PDCP Control PDU, wherein the PDU type being the PDCP status report request is used to request from the opposite PDCP entity the transmission of a PDCP status report.

* * * * *